(12) United States Patent
Rossi

(10) Patent No.: US 10,646,796 B1
(45) Date of Patent: May 12, 2020

(54) DEVICES AND METHODS FOR QUICKLY REMOVING UNWANTED WATER FROM TANKS

(71) Applicant: Thomas Ralph Rossi, Villa Park, CA (US)

(72) Inventor: Thomas Ralph Rossi, Villa Park, CA (US)

( * ) Notice: Subject to any disclaimer, the term of this patent is extended or adjusted under 35 U.S.C. 154(b) by 0 days.

(21) Appl. No.: 16/602,225

(22) Filed: Aug. 29, 2019

Related U.S. Application Data

(63) Continuation-in-part of application No. 16/280,013, filed on Feb. 19, 2019, which is a continuation-in-part of application No. 14/617,355, filed on Feb. 9, 2015, now abandoned.

(60) Provisional application No. 62/765,395, filed on Aug. 22, 2018.

(51) Int. Cl.
  *B01D 17/022* (2006.01)
  *F02M 37/22* (2019.01)
  *B01D 17/02* (2006.01)
  *F02M 37/24* (2019.01)

(52) U.S. Cl.
  CPC ......... *B01D 17/0202* (2013.01); *F02M 37/24* (2019.01)

(58) Field of Classification Search
  CPC .......................... B01D 17/0202; F02M 37/24
  USPC ..... 210/172.2, 172.5, 238, 470, 689, DIG. 6
  See application file for complete search history.

(56) References Cited

U.S. PATENT DOCUMENTS

| | | | | |
|---|---|---|---|---|
| 4,758,350 A | * | 7/1988 | Pitts | B01D 15/00 210/243 |
| 4,861,469 A | * | 8/1989 | Rossi | B01D 17/0202 210/172.5 |
| 4,861,470 A | * | 8/1989 | Casey | B01D 17/0202 210/172.5 |
| 5,035,805 A | * | 7/1991 | Freeman | B01D 17/0202 210/282 |
| 5,130,018 A | * | 7/1992 | Tolman | B01D 17/0202 206/204 |
| 5,252,203 A | * | 10/1993 | Lyda | B01D 17/0202 210/172.5 |
| 2015/0217215 A1 | * | 8/2015 | Edgar | B01D 35/005 210/263 |

* cited by examiner

*Primary Examiner* — Matthew O Savage

(57) ABSTRACT

The present invention includes iterations of devices for absorbing water and hydrocarbons that accumulate in hydrocarbon handling and dispensing systems, fuel tanks, sumps, and other oil and hydrocarbon storage tanks, at gas stations and other locations such as ports, commercial trucking facilities, government installations, military bases, privately owned and commercial shipping vessels, and privately maintained fueling locations including trucking facilities, etc. Specialized versions of the devices can also clean up petroleum slicks on water surfaces—known as "sheen" or petroleum-contaminated water (PCW"), and other contaminants. The present invention can stop "phase separation". Once they have absorbed water, most versions of the device can also be disposed of easily and economically compared to alternative disposal methods due to their extremely light weight and because they can be dehydrated before disposal.

9 Claims, 12 Drawing Sheets

DEVICES AND METHODS FOR QUICKLY REMOVING UNWANTED WATER FROM TANKS

STATE OF THE PRIOR ART

Thomas Rossi, the inventor herein, is also the inventor of currently-pending U.S. application Ser. Nos. 16/280,013, and 14/617,355, and currently-pending PCT application PCT/US/000025, and the specifications of all of those applications are hereby incorporated by reference.

Pipes, sumps, turbine sumps, above and belowground fuel storage tanks including the main tanks as well as turbine sumps, interstitial spaces between the double walls of fuel storage tanks, "under dispenser containers" ("UDC") that exist under fuel dispensers that serve to capture fuel commonly leaked from fuel supply lines and during the fueling or routine maintenance processes such as at a fueling facility (fueling facilities include, but are not limited to, "gas stations") and other areas associated with fuel handling/dispensing, shall be collectively referred to herein as "Tank" or "Tanks", and also fuel and oil storage tanks such as those in an oil refinery, port, or military base, or water-going vessel, or other fueling facility operated by a private company or government agency such as the U.S. Postal Service, hereafter also shall be included under the term "Tanks".

A volume of an oil product or byproduct such as (but not limited to) gasoline, fuel oil, benzene, or kerosene, generally is lighter than an equivalent volume of water, and so if oil products and the water flow into, or have a presence in, the same location, the oil products will generally float on the water. The same is true of many hydrocarbons; They are lighter than water and will float on water when in the same location. Accordingly, removing the water and separating it from the oil products is a problem in many situations, such as "gas stations", and other fuel storage and dispensing locations, as explained below. Further, current conventional methods for removing PCW consist of typically tubular absorbent socks that are extremely inefficient, largely because they cannot differentiate between water and hydrocarbons, so they absorb both in the same internal medium, as opposed to the current invention that accommodates easy extraction of water captured by the device in order to sharply reduce disposal handling and shipping costs.

Water can intrude into the interior of hydrocarbon fuel storage containers through valves and pipes becoming corroded, and allowing in water from outside, through groundwater and/or deck wash-downs and rainwater seeping into Tanks, and in other ways such as leaks around piping penetration points in under dispenser containers, sumps, etc. This allows fuel from Under Dispenser Containers and fuel containers and piping leaks to enter the ground, causing pollution and serious environmental damage, and allows water from outside to intrude into the under-dispenser containers, the fuel dispensing system, or Tank, causing further damage.

In addition to situations involving fuel storage, versions of the present invention can also be used to absorb water in other types of tanks, where water floats, inside the tank, below a lighter-than-water substance and the user wishes to remove the water.

Various inventors have created water-absorbent devices, but none of these devices includes the combination of features of the present invention. The present invention includes, among other embodiments, embodiments with an oleophilic containment skin, and embodiments with an oleophobic containment skin, which may be polyester, nylon, rayon, or another oleophobic material. The water only version of WATERHOG utilizes the same SAP water absorbent/petroleum repellant content in the device, but the casing and Leash may be polyester or nylon or rayon or any other oleophobic material that ignores hydrocarbons and may but does not necessarily need to by hydrophilic. This iteration is important if the user desires to collect any sheen or hydrocarbons in another way. The "water only" WATER HOG can collect water and ignore hydrocarbons.

U.S. Pat. No. 8,828,104 specifically mentions non-woven fabric in its claims. Claim 1 involves a dessicant that is molecular sieves, and a gelling agent, both of which are inside non-woven nylon fabric. The container can be a tube with both ends crimped up. However, the physical design of the invention of U.S. Pat. No. 8,828,104 is different from the physical design of the present invention because the structure of the invention is not specifically designed to address PCW on fuel Tanks, etc. that require certain shapes, sizes, and flexibility to be manipulated in Tanks and their plumbing and other internal structures. Many versions of the present invention include multiple layers covering the SAP (Super-absorbent polymer), where each layer has its own function, and some of the layers have functions that are not discussed in U.S. Pat. No. 8,828,104.

U.S. Pat. No. 4,758,350 by Pitts, et. al. discloses a device for absorbing water that has accumulated in Tanks, but that device is designed differently from our device, for many reasons, first, because the part of the invention of U.S. Pat. No. 4,758,350 that is lowered into the Tank to absorb water is structured differently from the parts of the invention that absorb water in the present invention. Pitts, et. al.'s invention uses a chamber that contains hydrophilic material and a coating on the fabric container that is soluble in water to absorb the water. Our invention does not use a water-soluble container for the chamber that contains the hydrophilic material. Pitts' invention uses untwisted filamentous yarn, sometimes coated with polyvinyl alcohol, as the structure of the water-absorbing chamber. Pitts' water-absorbing chamber is a bag, while our water-absorbing chamber is not a bag. The walls of our water-absorbing chamber are made of different materials from those in Pitts' invention. The water-absorbing chamber in our invention comprises a matrix/substrate with SAP or other oleophobic/hydrophilic material embossed or otherwise thereto. Pitts et. al.'s invention also uses acrylonitrile on starch-containing substrata as the water-absorbing substance, which is different from the water-absorbing substances used in our present invention. The means to cause the container and contents to sink in the water is different in Pitts' invention from what is used in our invention. Pitts' additional claims specify that the water-absorbing chamber should be lowered into the Tank through a cord, and the water-absorbing parts of our invention are not lowered into the Tank through a cord. Our "leash" is designed differently from a simple cord, and, in some embodiments, has oil-absorbing capabilities of its own.

At U.S. Pat. No. 4,758,350, Col. 2., lines 40-55, the authors found that not positionally maintaining hydrophilic material hurts the material's action because that material will tend to accumulate in areas of low surface area relative to volume. The present invention therefore includes a high surface area relative to volume of absorbent material. Some embodiments of the present invention also include internal compartments to provide an additional means to stop the water-absorbing substance from bunching up. Rather, our invention is structured to maintain even distribution of the active absorptive component(s). This does not make the present invention similar to Pitts' invention in any way.

U.S. Pat. No. 6,439,396 by Rutledge includes a column which is stuck into a Tank and has a spherical support body weighted to drop into the Tank, a filter including a hydrophilic substance bound to a medium, and a line, retaining means and handle attached to the support body. This structure is shown in FIG. 2A of Rutledge, and is structurally different from the present invention. The present invention is also designed to be lowered into, and easily removed from, Tanks with openings of varying sizes, cord, leash, some other type of tether while the invention in Rutledge is designed to be lowered into a single, specific, Tank. Our invention has fewer rigid components than that of Rutledge, so a single example of our invention (a single WATER HOG) can be used in more types of Tanks than Rutledge's invention.

U.S. Pat. No. 4,861,470 by Casey discloses a water absorbent device, open at one end, with a permeable component that can be taken out through that end and disposed of. Also an attachment means and rigid stop means and a ring encircling said housing. The stop means can be a cap. The water-absorbent means appears to be paper bags. This is different from the present invention, which uses a different water-absorbing means, and where the means of inserting the device into the Tank is different. The present invention also relies on the principle that the WATER HOG can simply be lowered into the Tank until it encounters and absorbs water. This is different from Casey, or, indeed, from any invention of the prior art.

Casey's invention also suffers from the disadvantage that Casey's invention is rigid, and therefore cannot adapt easily to turns in pipes and other rare characteristics of specific entities' fuel management infrastructure. Our invention, by contrast, is flexible, and can accommodate such turns.

The WATER HOG can simply be lowered into a Tank, and will sink until it reaches water. If necessary, a rod can force the WATER HOG through a layer of hydrocarbons to reach the water, and then the WATER HOG can be lowered into the water.

U.S. Pat. No. 5,993,656 by Cordani includes a water-permeable bag containing polyacrylamide, a container for the bag, and at least one throughhole so that water can contact the bag. The invention also includes one or more access ports to facilitate ease of removal, one or more retention screens, and a retrieval cord. The present invention is designed differently from Cordani's invention. The WATER HOG's entire surface is efficiently able to act to absorb quickly and to evenly its active contents to the water it is tasked to absorb and remove. Embodiments of the present invention involve two layers between the outside water and the SAP (Super-absorbent polymer). Both of these layers have specific purposes. Embodiments of the present invention also have an outer layer made of polyethylene, which is different from anything in Cordani's invention.

U.S. Pat. No. 5,252,203 by Lyda uses a device with 4 layers, in an elongated, generally tubular rigid frame with open spaces. A thick pad of hydrophilic material is around the outside of the frame. A layer of wettable fabric is placed around the hydrophilic material. An outer mesh screen layer is also part of the device. There is also a tethering and weighing means. The pad can be cotton. The fabric can be 2 layers and have polymers on the fabric. The tubular structure can be longitudinal members and ribs. The weighing means can be a metal rod. This is different from our invention because, among other reasons our invention uses a rod (which may be composed of metal) for a different purpose, and the outer layer of our invention is different from the outer layer of Lyda's invention. Our invention is also designed to save on shipping costs, relative to Lyda's invention.

U.S. Pat. No. 5,130,018 by Tolman includes an apparatus with an outer mesh and a balloon-like container that is inside the outer mesh, that fills up with polymer that has been exposed to water, when it is exposed to water. Tolman's invention also includes a cap for the container, and a cable and in addition certain parts of the outer container are explicitly convex. Tolman's invention is different from our invention for numerous reasons, including, but not limited to, the following: Our invention is designed so that the component containing the SAP cannot expand beyond a diameter warranted for a specific application. For example, if the invention needs to be inserted into a Tank through a pipe of three inches diameter, our invention can be designed for any protective skin (PC), the containment skin, and its contents to expand to a maximum diameter of less than three inches. Our invention is designed to be able to fulfill the specific purpose of being pushed down and easily extracted from a narrow tube to collect water that may have accumulated in a fuel reservoir connected to the tube.

U.S. Pat. No. 4,890,485 by Hsu includes a release mechanism that reacts to presence of water at a certain temperature, absorbent material, and a porous container that holds this material. However, Hsu's invention is different from our invention because the drawings of U.S. Pat. No. 4,890,485 show that Hsu's invention is shaped differently from our invention, and also because Hsu's invention appears to involve components which our invention does not involve, to keep the water-absorbing parts of Hsu's invention in one place. See, e.g., the cup (54) in Hsu, which is not present, and not needed, in our invention. Hsu's invention also appears to be focused on detecting water, and the water-detecting components of Hsu's invention are fixed in one location, while in our invention the water-absorbing components of the invention can be swept around the Tank, if desired.

U.S. Pat. No. 9,297,134 by Dancer includes a barrier for stemming inundations of water, but the present invention includes many features not included in Dancer's patent. Dancer's invention is also primarily a flood control device. Dancer's patent does not involve electronics or bioremediation at all. The WATER HOG, in most embodiments, includes SAP arranged in a different formation from the SAP in Dancer's invention. Versions of the present invention use a polypropylene containment skin. Versions of the present invention also use a polyester, nylon, rayon or other oleophobic containment skin, specifically because they are oleophobic, and Dancer's invention does not appear to contemplate use of any of these materials for use of the skin, or of any layer surrounding the SAP. Versions of the present invention also use Imbiber beads to contain the SAP. This is also absent in Dancer. In addition, versions of the WATER HOG include a metal rod attached along the length of the containment skin. This is also absent in Dancer.

The Ultra-Aqua Bag is a flood control device that includes four layers that contain a super-absorbent polymer. A description of the Ultra-Aqua Bag is at https:/store/jimbakershow.com/product/ultra-aqua-bags-5. The Ultra-Aqua Bag is shaped differently from the device of the present invention. The device of the present invention is more tubular than the Ultra-Aqua Bag, and versions of the device of the present invention utilize two layers of covering for the WATER HOG with different, specific purposes. By contrast, the Ultra-Aqua Bag's four layers are simply for the purpose of containing the SAP.

Imbiberbeads and their Use in the Present Invention

Imbiberbeads can be used to absorb hydrocarbons. They are an extremely oleophilic/hydrophobic material capable of rapidly absorbing petroleum products. Imbiber Beads tend to be more costly than SAP as employed herein. Therefore, they may be used in concert with the WATER HOG when an oleophilic absorptive "boost" may be required.

Polypropylene remains the current oleophilic mainstay for the purposes of our invention as to oleophilic and hydrophobic absorption needs. However, as the cost of Imbiber Beads reduces, it may be considered as greater candidate for more general inclusion in the WATER HOG.

Phase Separation

Phase separation can happen when water combines with alcohol (especially ethanol) to create a highly corrosive acid, which damages valves and other components of UDCs and Tanks. These components may then have leaks, allowing petroleum products or other non-aqueous products contained within a UDC or Tank to be released into the environment. Phase separation also leads to a need for components of UDCs to be replaced more quickly than they would otherwise. The growing prevalence of ethanol-blended fuels is increasing the incidence rate and awareness of the phenomena of phase separation. Proposed increases in the ethanol blend levels will further elevate a station's risk created by phase separation. These risks include damage to the petroleum infrastructure, damage to customer vehicles and station brand equity, and the potential to be left with unsaleable fuel. About 80% of all "gas stations" in the United States include ethanol in their gasoline and diesel fuel, and many other entities that control fuel distribution points also include ethanol in their gasoline and diesel fuels. In phase separation, the ethanol from the gasoline or other petroleum products combines with water that may be on the bottom of the Tank. The longer the water is there, present below the fuel in a Tank, the more of a chance that acid will spoil the fuel, or damage the Tank and/or related infrastructure and customer vehicle engines.

There are 3 main negative effects of phase separation:
Damage to retail dispensing infrastructure. The fluid resulting from phase separation is highly corrosive and can damage storage tank, submersible pumps, piping and fuel dispensers.
Damage to customer vehicles and a gas station's brand. Phase separation in most vehicles will cause engines to stall almost immediately, leaving disabled vehicles at the gas station. This will cause a bad image problem and drop in customer loyalty which is hard to recover from.
Out of spec or unsaleable fuel. The octane of pure ethanol is approximately 113, so to obtain 87-octane E10 gasoline, the pure gasoline used in this blend is below 87 octane. Thus after phase separation, the pure gasoline left is depleted from the ethanol and is thus of lower octane level.

Dispenser Filters

This is a line of defense against damaged vehicles that have received fuel from a fuel dispensing point. Each above-ground fuel dispenser has a disposable filter that must be replaced regularly. Some of these filters will also filter out water, by quickly constricting once water is detected. The result is a very slow flow of fuel out of the nozzle. Therefore, slow flow is a potential indication of water reaching the dispenser.

Filters reduce the damage, but they do not completely eliminate the potential to get phase separation in a vehicle. By the time phase separation is detected by a dispenser filter, it has already accumulated in significant volume, leading to much larger remediation costs. In order for phase separation to enter the dispenser, it must have gone through the tank's pumping system and piping. That also means that the tank must contain 5-6 inches of phase separation.

One purpose of dispenser filters is to capture contamination and phase separation that might get pumped up from the storage tank to the dispenser. A technician must disconnect the pipes to change the dispenser, and some of the phase separation often spills out and contaminates the ground or falls into the UDC which is an important function of the UDC, because it prevents contaminants from escaping into the ground provided there are no leaks in the UDC. Embodiments of the WATER HOG interrupt the phase separation in Tanks. Dispenser filters need to be serviced and changed, and when such a filter is changed, there is a possibility that fuel will accidentally be spilled. The present invention's casing is intended to absorb spilled fuel while simultaneously absorbing water present in the UDC. By doing so, phase separation is addressed and corrosion is prevented.

Term Numbers and Definitions

The following numbers shall represent the following components for purposes of this document. (1) Superabsorbent polymer. (2) Internal skeleton. (3) Tether. (4) Containment skin. (5) Protective Skin (PC). (6) Rod. (7) Leash. (8) Mesh. (9) Substrate. (11) Remediation pouch. (12) Remediation chamber. (13) Imbiber beads.

A WATER HOG™ is a device intended to address the capture and removal primarily of unwanted water and secondarily smaller amounts of hydrocarbons from pipes, sumps, turbine sumps, and Tanks generally. A WATER HOG (WH) can also be used to capture and remove unwanted water and hydrocarbons.

Once they have absorbed water, most versions of the device can also be disposed of easily and economically compared to alternative disposal methods due to their extremely light weight and also because they can relatively quickly be dehydrated before disposal, thereby sharply reducing carbon footprint and escalating disposal shipping costs by eliminating water that constitutes a great degree of unnecessary weight.

In a service station, in above or below ground motor fuel Tanks, for example, water becomes present due to condensation, seepage/water migration/intrusion around bulkheads or other penetrations for supply lines running from the turbine(s) pumping fuel to the dispensers via UDC's, rain water inundation or sheet flowing over underground storage tank fill caps or other openings due to rain or maintenance "wash down" by employees hosing to clean surface areas, etc., or other water intrusion sources. The water generally pools at the bottom of Tanks because water weighs more than hydrocarbons generally.

In fueling facilities, the gasoline and other fuel is pumped up to the above-ground fuel dispenser via a UDC. The channel between the above-ground fuel dispenser and the UDC is generally vertical. The UDC includes numerous valves, plumbing, fittings and other structures and devices, some of which control the flow of fuel to the above-ground fuel dispenser.

When the WATER HOG is dry it is very thin and can easily be inserted through an access point or passage, into the UDC to absorb the water there. The SAP in the WATER HOG will then absorb as much of this water as its capacity will allow, and expand very quickly, generally in 2 to 5 minutes, depending on factors such as ambient temperature and other factors. Different versions of the WATER HOG can be designed to expand only to a maximum diameter which will allow their unrestricted removal. This can be accomplished either through the amount of SAP content in a specific version, or the size of the casing, so that the amount of SAP, even when completely wet, will not expand the WATER HOG to the point at which it cannot fit through the access passage for extraction. The user can then withdraw the WATER HOG through the pipe, and dispose of the WATER HOG in the manner desired by the user in accordance with local, state, and national rules and regulations.

Some fueling facilities have drainage collection sumps, pits, or other means designed to retain possibly contaminated water or fuel that may accumulate on the ground area of the fueling facility. Gravity causes the accumulated water and petroleum products to flow into said sumps. A sump needs to be cleaned, and water that has accumulated in the sump needs to be drained, so that the sump does not overflow and cause contamination of the environment. Ways of cleaning the accumulated water in the sump usually involve use of a vacuum process similar to the process used to clean accumulated water in the underground fuel reservoirs. In the past, workers sometimes physically entered a drainage collection sump, but this has ceased because a person entering a drainage collection sump will be exposed to physically harmful substances such as contained in many oil products. The present invention avoids both of the above scenarios to enhance worker safety.

The WATER HOG™ eliminates a large number of problems and provides excellent remedies by offering a low cost/low personal risk solution that allows, for example, a gas station operator to perform the PCW extraction operation without the use of a costly and time consuming "pumper service" or a team of technicians and equipment creating obstacles in the way of vehicular and pedestrian traffic, and the PCW extraction operation can be performed quickly at any hour of the day or night, and can be performed more safely due to lower likelihood of a technician or other pedestrian or other objects being struck by a vehicle or equipment during maintenance operations where distractions may occur. The WATER HOG™ service could be performed with minimal traffic flow disruption and at a substantially lower cost and risk of personal injury or other damage than by the use of a "pumper truck" or vacuum service, or similar, that would occupy a considerable amount of space in a generally/potentially crowded situation whether in a gas station, other fueling facility, etc. This is important because vacuum trucks generally visit "gas stations" during business hours, and use up space, so the consumers trying to purchase fuel at the "gas station" may not be able to do so or may be put at unreasonable risk or delayed.

WATER HOGs™ may be extended/introduced into a tank, pipe or other body by use of a rod or rod-and-rope/cable combination or by other means.

In one iteration the WATER HOG™ consists of a narrow water soluble tube similar to a drinking straw containing an oleophobic but hydrophilic SAP, in the form of fibers, powder, granules or other embodiment of the SAP, encased in an oleophobic fabric cloth tubular containment "sock" or "casing" of some sort that would be inserted into a Tank or other cavity via the Tank fill hole, or another aperture such as a service maintenance panel in a fuel dispenser or under-dispenser container, and the WATER HOG would be forced/guided to the Tank bottom by the use of a rod or other means. The narrow water soluble tube would control the SAP and keep it in place so that it would not shift and pool or clump in a way that might cause the SAP to experience uneven distribution to an extent that would inhibit optimal performance, thereby maintaining uniform distribution of the SAP.

In lieu of the expensive Vacuum Pump process, water in Tanks would be arrested by the WATER HOG™'s hydrophilic/oleophobic super absorbent polymer ("SAP") content that ignores hydrocarbons.

A WATER HOG™ could also be encased in a PC (protective casing) (5) or mesh (8) or other rugged, and in some cases perforated, casing to protect the WATER HOG™'s inner casing (The containment skin (4)) from tearing due to contact with sharp edges in or about a Tank, and also to limit the degree of expansion of the WATER HOG™ as it absorbs water, but allow water to enter and contact the SAP. Limiting/controlling the degree of expansion and shape of the WATER HOG™ will ensure that the WATER HOG™ will not expand beyond the maximum diameter that would allow its extraction from the Tank or other area into which it is inserted.

In another of several iterations, the WATER HOG™ may also be made in a flat configuration that may utilize a different embodiment of the SAP that may be bonded, embossed, or otherwise attached to a cellulosic or other type of web, medium, or other embodiment such as a substrate. Please see FIG. 1. Accordingly, the SAP could be contained in a water soluble or water permeable tube or other enclosure/casing/shell, formed into a matrix or substrate for uniform distribution wherein the substrate is a material such as paper, cardboard, cellulose, or other material, or otherwise constituted depending on the intended application, and the SAP is adhered to the substrate. The substrate, which may be made of paper, cardboard, cellulose, or other material, "hosts" the SAP/Imbiber Beads, and forms a matrix.

A WATER HOG™ can be made to lie flat on a Tank's lower reaches where water would pool. Weights can be added to the WATER HOG to accomplish this if needed. Alternatively, the WATER HOG's general design and characteristics are such that the WATER HOG quickly absorbs water which can cause it to simply fall within the Tank, as it continues to encounter water. The WATER HOG would lie on the bottom of the Tank, and as water comes into contact with the SAP, the water would be absorbed by the SAP. The SAP would swell and become a gel as it absorbs water and continue to hold the water as a result of the SAP absorbent's strong hydrophilic properties. The amount of SAP in the sock or other enclosure, depending on the application to which it is being tasked, would be sufficient in quantity to capture the water without swelling to an unacceptable size that might prevent the WATER HOG, which, depending on the application, may be approximately as little as one inch or less, or much larger, in diameter, from being removed from the area being treated through the Tank fill aperture or piping or other aperture.

An innovative and aggressively hydrophobic/oleophilic material (Imbiber Beads or similar ["Beads"]) or similar material that would co-exist with the SAP, may be included in the WATER HOG™ to augment/accelerate the capture of "oil sheen" to the exclusion of water within Tanks, in addition to the collateral benefits of a polypropylene casing, tether, etc. as addressed above. Oil sheen is generally a very thin layer of hydrocarbons on the top of the water in the Tank and thus generally contains little oil albeit sheen still remains an unwanted and problematic presence in Tanks. However, even though little attention has been paid to the characteristics of oil sheen in the past due to the difficulty of dealing with it, oil sheen may, in addition to encouraging phase separation, encourage a build-up of slime and other unwanted conditions in tanks, sumps, etc., in some instances by acting as a "glue" for accumulation/congregation of corrosion-causing acids and debris. If there is ethanol in the Tank, phase separation is a resulting concern. This in turn can lead to corrosion of plumbing, fittings, pumps, and other complications.

Oil sheen also forms petroleum-contaminated water (PCW) which cannot, in accordance with multiple governmental guidelines and laws, be allowed to seep or leak from tanks, etc., and find its way into the environment. This was a constant problem in the past, but has now been recognized and is receiving much greater attention. The WATER HOG™ offers an innovative, cost effective, and environmentally sound solution to PCW issues, including limitation of environmental contamination. The efficiency of the WATER HOG's hydrophilic/oleophobic SAP polymer filled casing or other apparatus whose outer casing, in the case of our "Water & Sheen" version, simultaneously provides a hydrophobic/oleophilic element due to the WATER HOG's polypropylene (or other) outer casing, rope, and other parts means the function of capturing unwanted water in Tanks, and the function of capturing unwanted oil sheen are highly synergistic—these two abilities do not detract from each other's function but instead complement each other, and each of these abilities thereby does not reduce but in fact enhances the efficacy of the companion ability. The hydrophilic/oleophobic inner SAP-filled sock captures water to the exclusion of hydrocarbons while the hydrophobic/oleophilic polyethylene outer parts act as hydrophobic/oleophilic elements to arrest sheen.

On the other hand, our "Water Only" version has an outer casing that will not collect oil products. This is important in situations when water is to be absorbed by the WATER HOG, but when for a variety of reason a user may elect to absorb sheen, if the sheen is present at all, by other means.

The WATER HOG™ can employ SAP to collect water to the exclusion of hydrocarbons, thereby not allowing the WATER HOG's efficacy to be negatively impacted by substances and compounds other than water, while in some embodiments the WATER HOG may simultaneously employ Imbiber Beads, polypropylene, and or other oleophilic materials to selectively capture sheen to the exclusion of water—thereby not interfering with the WATER HOG's efficacy and allowing it to perform its main function of water absorption.

The removed WATER HOG™ may then be disposed of in accordance with waste disposal methods, regulations and guidelines as prescribed by local, state and federal laws, rules, and regulations.

In most cases, the containment skin could be burned for energy. The containment skin does not need to be burned, however, this is simply one option, especially when one considers that the casing also could contain absorbed oil for additional BTU generation value.

The invention also includes methods of using WATER HOGs to absorb water accumulated in hydrocarbon storage tanks, help inventory management and component maintenance for entities that store and dispense hydrocarbon products, and engage in pollution control.

Transportation to Location of Use

The WATER HOG weighs much more when wet than when dry. As an example, a version of the first embodiment of the WATER HOG weighs as little as two ounces when dry, but can weigh eight and a half pounds per gallon of water absorbed when wet, because the SAP absorbs a very large amount of water relative to its own weight. WATER HOGs can therefore be transported easily to the location where they will be used, and a very large number of WATER HOGs could theoretically be transported to the same location at once. In additional, WATER HOGs require substantially less storage space and afford much greater ease of handling before and after use. This makes use of the WATER HOGs substantially less costly than previous technologies. This also means that a large number of WATER HOGs can theoretically be quickly transported to a location where they need to be used in a situation such as a natural or man-made disaster, or in a situation where the roads or other transportation network leading to the location where the WATER HOGs are to be used is poorly developed or damaged. A good example of this condition could be that following a hurricane, when water intrusion in Tanks can be very widespread and strain the ability of workers to remedy the situation before damage occurs to Tank systems. WATER HOGs could more easily and quickly be delivered by a variety of means.

The First Embodiment

The first embodiment of the WATER HOG is described as follows: The WATER HOG will have a core of super-absorbent polymer (1) which can be, but does not have to be, in the form of Imbiber Beads (13). The super-absorbent polymer may also be polyacrylamide or another super-absorbent polymer. Surrounding this core will be a containment skin (4) which can be made of polypropylene or another oleophilic material. The WATER HOG will also have means of being placed in the Tank, and removed from the Tank, said means usually being a rope- and or tether combination. The rope and tether may be made out of polypropylene. The polypropylene is oleophilic but hydrophobic. The means through which the WATER HOG can also be placed in or out of the Tank may also be a leash made of a strip of polypropylene or other material The leash for our Water & Sheen version could be made from a variety of oleophobic materials including polyester, nylon, and others.

The WATER HOG may be shaped like a tubular "sock", similar in shape to a drinking straw, or flat in shape, and will be inserted into a Tank. Gravity or guidance by use of a pole or similar device will then cause the WATER HOG to sink until it contacts water. The WATER HOG will then absorb water. Within a few minutes, the WATER HOG will expand until it has absorbed all the water it can, or alternatively, until there is no more water for it to absorb. As the WATER HOG absorbs water, the WATER HOG will sink as the water level in the Tank drops. The Protective Casing and containment skin may be designed with small openings so that the water can easily penetrate to the SAP.

In lieu of the Vacuum Truck Process ("VP"), the user can arrest water in Tanks by using the WATER HOG™'s hydrophilic/oleophobic super absorbent polymer ("SAP") content that ignores hydrocarbons. Sheen in the Tank may be absorbed by the WATER HOG™'s hydrophobic/oleophilic polypropylene (or other) containment skin, its polypropylene "rope" tether or leash, a strip of very aggressive and highly oleophilic Imbiber Beads or additional polypropylene elements, or a combination of the above.

A version of the first embodiment can weigh as little as two ounces when dry, but will absorb water and swell up to approximately 8.5 pounds (representing one gallon of water) within less than five minutes, when wet. The additional pounds represent water that the SAP in the WATER HOG has absorbed. Larger versions can absorb greater quantities of water.

In the first embodiment, and indeed every embodiment that uses both an oleophilic component and a hydrophilic component, the hydrophilic component(s) absorb(s) water, and the oleophilic component(s) absorb(s) oil-related products. For example, in the first embodiment, the hydrophilic SAP absorbs water, and the oleophilic containment skin will absorb oil-related products. The WATER HOG will sink until it encounters water, which it will absorb, and the containment skin will absorb any oil products that have mixed with the water and created sheen. Some versions of the first embodiment (and all other embodiments) may have a leash, a rope and tether combination, or both a leash and rope and tether combination.

Every version of the Water Hog can accommodate either a leash a rope and tether combination, or both a leash and rope and tether combination.

The Second Embodiment

In the second embodiment of the invention, the SAP is embossed or otherwise laid out in on substrate and may be bonded, embossed, or otherwise attached to a web/matrix/substrate/medium (these terms are interchangeable for purposes of this invention) made out of paper or cellulosic or other "host" material in a substrate. Some versions of the second embodiment also have a matrix shell (11) that holds the SAP and helps the WATER HOG to maintain its shape and even dispersal of the SAP. For example, the cellulosic material in a matrix can spiral out from the center of the WATER HOG, can be in a large number of arms that emanate out from the center of the WATER HOG, or can be in a sheet.

The matrix may also be adhered to an internal skeleton, to ensure maximum exposure to water when the WATER HOG is placed in a Tank.

The second embodiment can also be configured in the following manner: The containment skin (4) would be on the outside of the WATER HOG, the WATER HOG will be hollow, and the substrate, on which is placed the SAP, will be on the inside of the WATER HOG. Then, when the WATER HOG is placed in water, the SAP attached to the substrate will absorb water.

In other versions of the second embodiment, an oleophilic material such as polypropylene and or Imbiber Beads may also be sprinkled or otherwise spread onto the substrate in conjunction with the SAP.

The Third Embodiment

The third embodiment involves a rod that is attached to the WATER HOG, and is used to insert the WATER HOG into the Tank. The user pushes the rod, which in turn pushes the WATER HOG in a desired direction such as in the direction of greater depth within the Tank. The user can push the WATER HOG through an opening in a Tank, or through a pipe, into a Tank. Versions of the third embodiment could, in principle, include a rod and a tether and/or leash, or a rod attached to a tether/leash, which would be attached to the rest of the WATER HOG.

The Fourth Embodiment

The WATER HOG can Collaborate with and Accommodate a Range or Remediation Agents.

The fourth embodiment of the invention may utilize one or more chambers (remediation chambers (12)), in the WATER HOG, that include specialized microorganisms or other agents that can be used to clean up specific pollutants. Some of the microorganisms can be used to absorb dangerous, hazardous, or unwanted elements that might have contaminated the water in the Tank or the oil products floating on top of the water. Remediation chambers are hollow areas in the WATER HOG in which these microorganisms are placed. For example, they can be hollow areas in the SAP, or hollow areas in between a containment skin (4) and a PC (5) that surrounds the containment skin.

The microorganisms in the fourth embodiment might also be contained within "remediation pouches", which are pouches in the WATER HOG, outside the SAP core, that are exposed directly to the environment. For example, they might be on the outside of the containment skin (4) when that is the outermost layer of the WATER HOG.

Some versions of the fourth embodiment will include at least one "remediation pouch" (12) that contains an agent that has the ability to clean up one or more pollutants, generally by absorbing or bonding with the pollutants. The remediation pouch(es) can be inside the Containment skin. The remediation pouch(es) can be made of some material that disintegrates in water, such as paper. Therefore, when the WATER HOG is inserted into water, the remediation pouch will disintegrate and the remediation agent will be released to absorb or bond with the pollutant. The agent, bound to the pollutant, will precipitate out of the water and oil products within the Tank.

The difference between a remediation chamber and a remediation pouch is that a remediation pouch will disintegrate when exposed to water, while a remediation chamber is a hollow space within the WATER HOG that is surrounded by the other material of the WATER HOG, and which expands as pollutants flow into the remediation chamber.

The agent within the remediation chamber also is more likely to remain within the WATER HOG, bound to the pollutant, after it reacts with the pollutant.

A WATER HOG can contain multiple remediation pouches and/or remediation chambers, some of which contain different 'agents, to be able to deal with water that is contaminated with multiple pollutants.

The agents within remediation chambers and remediation pouches do not need to be biological in nature, though they often will be.

There is sometimes a danger from pollution contained within water that is inside a Tank, where the pollutants will be carried by the liquids in the Tank if they escape the Tank. This embodiment of the WATER HOG helps to neutralize and/or contain the pollutants, stopping them from contaminating other areas.

Some examples of chemical agents that will bond with pollutants are chelating agents such as EDTA. EDTA will bind with lead, and the combined product will precipitate out of water solution. Therefore, a user that fears that water within a Tank includes lead can deploy WATER HOGs with remediation pouches or remediation chambers containing EDTA in the Tank. If the lead reaches the remediation pouches, the walls of the remediation pouches will disintegrate, and the EDTA will be released into the water, to bind to the lead molecules and cause the combined lead-EDTA complex to precipitate out of the water. If the lead reaches the remediation chambers, the lead will be absorbed into the EDTA and the remediation pouches will expand and hold the lead and EDTA for subsequent removal and treatment.

WATER HOGs with remediation pouches or remediation chambers containing other types of chemical agents are possible.

Remediation pouches or remediation chambers can also contain organisms, such as microorganisms, that can neutralize specific pollutants by processing them, binding with them, or absorbing them. These organisms fall under the definition of "agents" in this document. Bacteria and Fungi that aid in bioremediation are two examples of these organisms. These remediation pouches can aid in bioremediation and biodegradation, bioaugmentation and biostimulation.

Some bacteria that can be placed in the remediation pouches or remediation chambers include *Pseudomonas Putida*. *Pseudomonas putida* is a gram-negative soil bacterium that is involved in the bioremediation of toluene, a component of paint thinner. It is also capable of degrading naphthalene, a product of petroleum refining, in contaminated soils.

*Dechloromonas aromatica* can also be placed in the remediation pouches, or remediation chambers, and is a rod-shaped bacterium which can oxidize aromatics including benzoate, chlorobenzoate, and toluene, coupling the reaction with the reduction of oxygen, chlorate, or nitrate. It is the only organism able to oxidize benzene anaerobically. Due to the high propensity for benzene contamination, especially in ground and surface water, D. aromatic is especially useful for in situ bioremediation of this substance.

Deinococcus radiodurans, which can also be placed in the remediation pouches, or remediation chambers, is a radiation-resistant extremophile bacterium that is genetically engineered for the bioremediation of solvents and heavy metals. An engineered strain of Deinococcus radiodurans has been shown to degrade ionic mercury and toluene in radioactive mixed waste environments.

WATER HOGs, each containing two or more remediation pouches or remediation chambers, where some pouches or chambers contain bacteria that will oxidize ammonium to nitrite, and a second remediation pouch or chamber that contains bacteria that will oxidize nitrite to nitrate, and can also be used to remove unwanted nitrogen compounds. Industrial bioremediation is used to clean wastewater. Most treatment systems rely on microbial activity to remove unwanted mineral nitrogen compounds (i.e. ammonia, nitrite, nitrate). The removal of nitrogen is a two stage process that involves nitrification and denitrification. During nitrification, ammonium is oxidized to nitrite by organisms like *Nitrosomonas europaea*. Then, nitrite is further oxidized to nitrate by microbes like *Nitrobacter hamburgensis*.

In anaerobic conditions, nitrate produced during ammonium oxidation is used as a terminal electron acceptor by microbes like *Paracoccus denitrificans*. The result is $N_2$ gas. Through this process, ammonium and nitrate, two pollutants responsible for eutrophication in natural waters, are remediated.

Other remediation pouches and/or remediation chambers can contain agents designed to bind with Zinc and other heavy metals, and remove them from water.

*Methylibium petroleiphilum* (formally known as PM1 strain) is a bacterium capable of MTBE bioremediation, and PM1 can be used in remediation pouches or remediation chambers. PM1 degrades MTBE by using the contaminant as the sole carbon and energy source.

*Alcanivorax borkumensis*, which can also be used in remediation pouches or remediation chambers, is a marine rod-shaped bacterium which consumes hydrocarbons, such as the ones found in fuel, and produces carbon dioxide. It grows rapidly in environments damaged by oil, and has been used to aid in cleaning the more than 830,000 gallons of oil from the Deepwater Horizon Oil Spill in the Gulf of Mexico.

Spores of fungi, including, but not limited to, *P. chrysosporium*, can also be used in remediation pouches or remediation chambers. *P. chrysosporium* was the first fungi linked to degradation of organic pollutants. Extensive research has shown this it has strong potential for bioremediation in pesticides, PAHs, dioxins, carbon tetrachloride, and many other pollutants. However, fungi are effective at PAH degradation in comparison to bacteria for a few reasons. Firstly, they are capable degrading PAH's that are high in molecular weight, bacteria in comparison are better at degrading smaller molecules. Secondly, fungi can function well in non-aqueous environments and low oxygen conditions, both of which are conditions where PAH's can accumulate. For example, fungi are useful in situations where contaminants are physically blockaded (such as inside a Tank) and bacteria cannot reach or in circumstances of environmental extremes such as when high acidity or dryness prevent bacteria from functioning.

Some remediation pouches or remediation chambers can also include a nutrient medium inside the remediation pouch or chamber, which will allow any lifeforms inside the remediation pouch, or chamber, that require nutrition to survive, to receive such nutrition.

It is important to note that some lifeforms, such as spores of fungi, or of bacteria, require little or no nutrition until they germinate and start to grow. Therefore, remediation pouches and remediation chambers containing spores of some fungi, for example, would often not need such a nutrient medium.

The Fifth Embodiment

The fifth embodiment can involve a containment skin (4), but the containment skin and leash (if present) will be made of polyester or nylon or rayon or any other oleophobic material that ignores hydrocarbons. If an operator wishes not to collect any sheen, or not collect hydrocarbons in general, except in another way (not through the WATER HOG but perhaps by use of specialized absorptive mats for whatever reason), this fifth embodiment of the WATER HOG, which collects water only, will collect water and ignore hydrocarbons such as sheen in the Tank. Sheen, for example, will, in the absence of water, simply be considered as hydrocarbons, in the hydrocarbon liquid Tank. The "water only version" of the WATER HOG can without a second thought be easily disposed of, through being discarded in the trash so long as no incidental hydrocarbons are absorbed or adhere to the Containment skin or the PC. The sheen would then be collected by other means such a soil wiping rags, oil absorbent mats etc.

The Sixth Embodiment

The sixth embodiment uses an outer protective casing (PC) (5) which protects the containment skin (4) from tears from any sharp objects that may exist in the Tank.

If the containment skin (also referred to as containment casing) is polypropylene, the water can be absorbed by the SAP, and the hydrocarbons in the sheen could be absorbed by the WATER HOG™'s PC, its polypropylene "rope" tether, and in another version could include a strip, or other contained amount of very aggressive and highly absorptive Imbiber Beads or additional Super-absorbent Polymer, elements, or both, and/or the WATER HOG's rigid or semi-rigid or flexible rugged outer casing ("Containment Casing") made from a variety of materials including polyethylene plastic sheet tubing or other oleophilic/hydrophobic outer protective casing. All of the foregoing mentioned sheen absorbers are oleophilic and hydrophobic. In some iterations the containment skin and/or the protective casing will have no or limited absorptive properties, such as stainless steel tubing (list not inclusive).

The PC provides protection for the containment skin, in embodiments where the PC is used.

OTHER EMBODIMENTS

In a seventh embodiment, the WATER HOG can have one or more zippers, in each of the layers enclosing the SAP, so that a user who wishes to empty the SAP in the WATER HOG can unzip each of the zippers, and pour out the SAP. Then, if the user wishes to re-use the casings, and put "refill pouches" of SAP into the WATER HOG again later, the user may do so, and zip up the WATER HOG again. For example, the PC may have a zipper, and the containment skin may have another zipper.

WATER HOGS that contain other means of opening and reclosing the containment skin and PC to remove the SAP and add new SAP are explicitly part of the present invention.

Other embodiments of the WATER HOG are possible that combine characteristics of two or more of the embodiments described herein, and/or that have other characteristics presently known in the prior art.

Some More Advantages of the Water Hog Over the Prior Art

America's petrochemical industry, including entities such as fueling facilities, and oil refineries, must become more efficient, and create less pollution, to continue to stay competitive. The WATER HOG makes gas stations and other fueling/fuel handling facilities more efficient in the follow ways. First, the WATER HOG is very easy to transport to the site where it is needed, which lowers transportation costs and cleanup costs directly, and therefore lowers operating costs. Second, the WATER HOG can in some iterations generally be reused, in principle, which makes use of WATER HOGs easier and cheaper for an entity that controls a fueling facility to use WATER HOGs to remove unwanted water from its Tanks. Third, some embodiments of the WATER HOG can be used to clean up other forms of pollution, or unwelcome heavy metals or other contaminants that might exist in a Tank. Fourth, the WATER HOG is simply a lesser "all-in" cost to produce, deliver, and use than many presently available alternatives, such as vacuum trucks. Fifth, the WATER HOG provides additional flexibility to fuel dispensing operators, in that the WATER HOG allows them to clean water out of their Tanks at times when few customers need to use their fueling locations. This results in fewer delays for customers, and more revenue for the fuel dispensing operator.

In a "gas station", for example, above-ground fuel dispensers generally cannot be used by customers when a vacuum truck is removing water from the Tank from which that above-ground fuel dispensers draw fuel. The areas are generally "roped off" during the service process. This creates longer lines for customers, lower customer satisfaction, and lost revenue for the "gas station", because customers who find that all of the above-ground fuel dispensers in a "gas station" are not available will sometimes go elsewhere.

Sixth, the "WATER HOG" helps operators of "gas stations" and other fuel dispensing locations to better preserve the value of their land, because the WATER HOG reduces the amount of hydrocarbon and other pollution that escapes into the land. If a piece of land has too high a level of hydrocarbon pollutants, that piece of land will become unsuitable for certain uses, like restaurants, for example. It the land is unsuitable for certain uses, the value of that land is lower than it would be otherwise. The WATER HOG reduces the amount of pollution that escapes into the land where a fuel dispensing location is located, therefore the WATER HOG helps to preserve the values of properties where fuel dispensing locations are located.

"Gas stations" and other fuel dispensing locations will also usually have a better idea of the amount of fuel in their Tanks if they often use WATER HOGs to remove unwanted water from the Tanks. Fuel dispensing locations that use WATER HOGs will therefore also reduce their costs because they will not need to have their Tanks unnecessarily refilled.

Use of the WATER HOG will therefore allow fuel dispensing locations to serve their customers better, and manage their inventories better, and also to hopefully increase their operating margins. This will enable fuel dispensing and fuel handling locations to lower prices they charge to any customers, and to potentially lower fuel prices. Customers will also benefit because they may experience lower fuel prices, and also fewer delays in waiting for vehicles to be refueled.

The WATER HOG can also be used more often than vacuum trucks, because the WATER HOG is less costly and easier to use than a vacuum truck, and also takes less time to use than a vacuum truck. This factor has many benefits for operators of fuel dispensing locations. One such benefit is that if water is removed from a Tank more often, this decreases the possibility of environmental harm and damage from phase separation or other corrosive effects, and also decreases damage to components such as valves, fittings, piping within the fuel dispensing system that result from corrosion. The WATER HOG can therefore help operators of fuel facilities to increase the lifespans of their equipment, and therefore decrease costs created by equipment repair and maintenance, thereby increasing profits, and/or decreasing the prices they charge to consumers.

Disposal of the Water Hog after Use

The first embodiment, and most other embodiments, of the WATER HOG can be disposed of after use in numerous ways, some of which are the following:

First, the user can cut open the WATER HOG, pour out the SAP, and allow the SAP to dehydrate. In embodiments with zippers, the user can use the zippers to open the layers of the WATER HOG that surround the SAP. Once the SAP has dried, it will have a fraction of the weight that the SAP had when it was wet. Therefore, the SAP can be disposed of much more easily and economically.

Second, the user can place the whole WATER HOG in a safe location where the WATER HOG can dry. The WATER HOG will then rapidly lose weight. The whole WATER HOG can be disposed of more easily because it will have lost most of its weight as the water evaporated.

Third, the user can dispose of the whole WATER HOG in accordance with local, state, and federal\ regulations. In most cases, the WATER HOG can be placed in a "Hazmat" container, which are in many cases available to fuel dispensing operators in the fuel industry. If applicable regulations allow the WATER HOG to be simply thrown away, the WATER HOG can be simply discarded.

The Methods

Uses of the Water Hog with Rossi's Other Inventions

Thomas Rossi, the inventor herein, is also the inventor of currently-pending U.S. application Ser. Nos. 16/280,013, and 14/617,355, and one of the inventors of granted U.S. Pat. No. 10,019,430. Thomas Rossi is also the inventor of granted U.S. Pat. No. 8,512,552. The employment of these inventions with the WATER HOG all make the WATER HOG more effective. U.S. Pat. No. 10,019,430 includes the possibility of a business creating a profile using the systems and methods of filling out forms described in U.S. Pat. No. 10,019,430. A user of the WATER HOG can create a profile for one or more fueling facilities or other entities that use Tanks. The Online Profile created for each entity would include information about the Tanks controlled and/or owned by that entity. The user can share this information, as a "tier", with the supplier or manufacturer of the WATER HOG. Then, the user can receive recommendations about the content and number of WATER HOGS to use, and the optimal use of these WATER HOGS, based on the information in the Online Profile. The recommendations may be computer-generated based on the information in the shared "tier", or created and/or customized by a human representative of the manufacturer, or some combination of the above.

FLOODBAG is the invention described in application Ser. No. 16/280,013, and also variations of FLOODBAG are described in Application PCT/US/000025. FLOODBAGS can be used in conjunction with WATER HOGS in numerous systems and methods. For example, a user can deploy FLOODBAGS around a Tank, to limit the amount of water that can infiltrate the Tank (Or can escape the Tank), and also use the WATER HOGs to clean up water that has already infiltrated the Tank.

If a Tank has not been used for a long time, then the FLOODBAGs, potentially containing specialized microorganisms that clean up specialized pollutants, can be deployed around the Tank for medium-term or long-term protection, while the WATER HOGs can be used to clean up water that has infiltrated the Tank.

This would be highly useful in situations where an entity that owns Tanks is not using them to full capacity, but wants to maintain the Tanks and use them at a later date. For example, some oil refineries that own oil storage tanks do not keep them all filled, all of the time, but instead keep some Tanks empty for years at a time. WATER HOGs could be left in these tanks as "silent sentinels" to absorb condensation or water intrusion from other causes such as heavy rainfall/hurricanes, seepage around and through—hull piping fittings, etc.

When a hurricane, flood, or other disaster threatens the area where a Tank is located, a similar system of water-activated FLOODBAGs can be used to protect a Tank, while WATER HOGs are used to absorb any water that has infiltrated into the tank, either before or after a storm.

A system related to the Vital Data Assistant (VDA) invention can be used with WATER HOGs. The Vital Data Assistant system uses a sticker containing a unique QR code and an alphanumeric code to control access to databases including a user's medical history information and databases containing the user's personal contact ("next of kin") information and certain legal information about the user.

Here, a sticker or medallion containing a unique QR code can be applied to a Tank, and the code can give access to a database such as that used by the IFORMS invention of U.S. Pat. No. 10,019,430, including specific information about the best ways to remove water from that Tank using a WATER HOG, the locations of any known sharps in the Tank, and other information about the Tank. The information may only be available to authorized personnel, such as employees of the entity that owns the Tank, or employees of a maintenance company.

The invention of U.S. Pat. No. 8,512,552 also can be used together with WATER HOGs. The invention of U.S. Pat. No. 8,512,552 is a spill cleanup mat that cleans hydrocarbon spills on a solid or water surface, among other spills. In situations where hydrocarbons have spilled out of a Tank, a user can use the invention of U.S. Pat. No. 8,512,552 can be used to clean up the hydrocarbons around the Tank, and the WATER HOG can be used to clean up any water that has accumulated in the Tank (such accumulated water may or may not have been the cause of the spill). The invention of U.S. Pat. No. 8,512,552 can also be used together with WATER HOGs in other ways. Sheen removal through this combination of inventions could mean no need or less need for Imbiber Beads.

Nothing herein detracts from the scope of U.S. Pat. No. 8,512,552 or 10,019,430, or any patent application mentioned herein.

The "Pool & Spa Saver Mouse" is another invention of Thomas Rossi. The "Pool & Spa Saver Mouse" is a device for removing oils, including leftover suntan oils, and other related chemicals from pools. It is generally placed by the filter of a pool, and binds to these chemicals as they approach the filter. However, the Pool & Spa Saver Mouse can also be used in other areas to clean up stray oils, such as suntan oil. The "Pool & Spa Saver Mouse" can be used together with the present invention in a method where the Pool & Spa Saver Mouse absorbs stray oil that may have escaped out of the fuel dispensing system, and the present invention can be used to capture water that has arrived in the fuel dispensing system.

Bilge Booms and the Super Mat are two other inventions of Thomas Rossi that can also used to clean up stray oil that has exited the fuel dispensing system, while a WATER HOG is used to clean up stray water inside the fuel dispensing system (which might have caused the stray oil to exit).

DETAILED DESCRIPTION OF THE DRAWINGS

Figure 1:
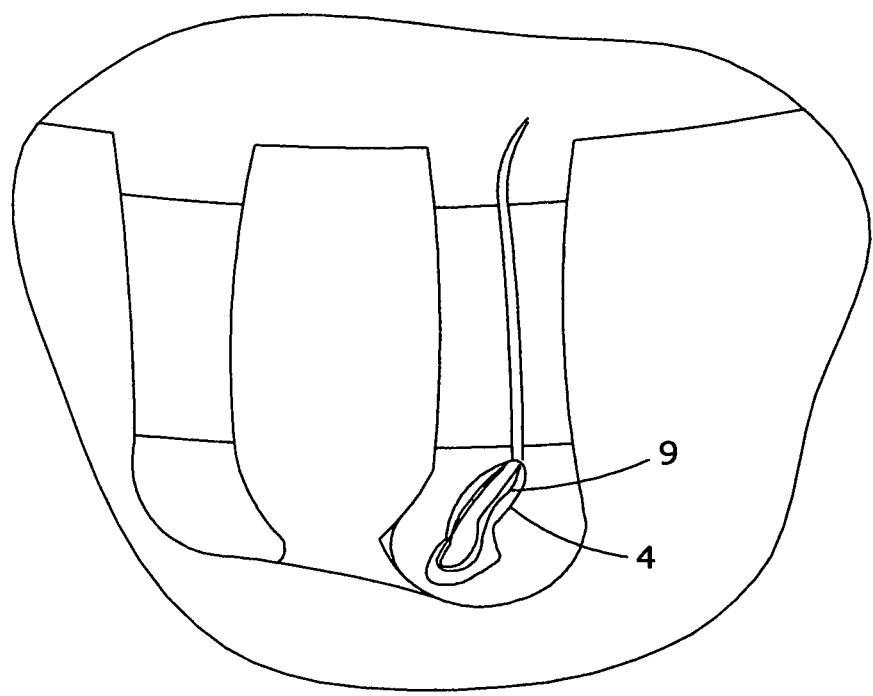
FIG. 1 shows a WATER HOG of the second embodiment inserted into a turbine sump. The fuel in the sump is floating on a layer of water that has accumulated there, in the lower areas of the turbine sump. Water is being absorbed into the WATER HOG. The matrix is exposed to the water.

FIG. 1 shows a cut-away view of a WATER HOG inserted into a turbine sump. The gasoline in the turbine sump is floating on a layer of water that has accumulated there. Water is being absorbed into the WATER HOG. The substrate (9) is exposed to the water. Within a few minutes, the matrix will have gained several pounds of water.

Figure 2:
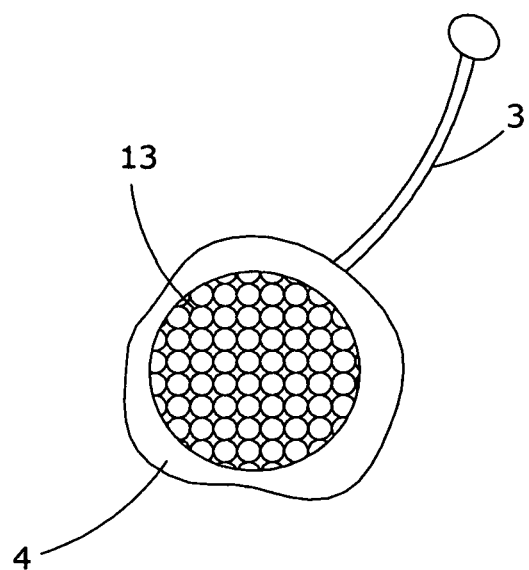
FIG. 2 shows a cross-section of a version of the first embodiment of the WATER HOG.

FIG. 2 shows a cross-section of a version of the first embodiment of the WATER HOG that uses Imbiberbeads (13). The containment skin (4) surrounds the Imbiberbeads. The device has a tether (3) that helps it to be moved into, and out of, Tanks. The difference between the tether and a leash can be seen, because the leash would be a single strip, while a tether is not.

Figure 3:
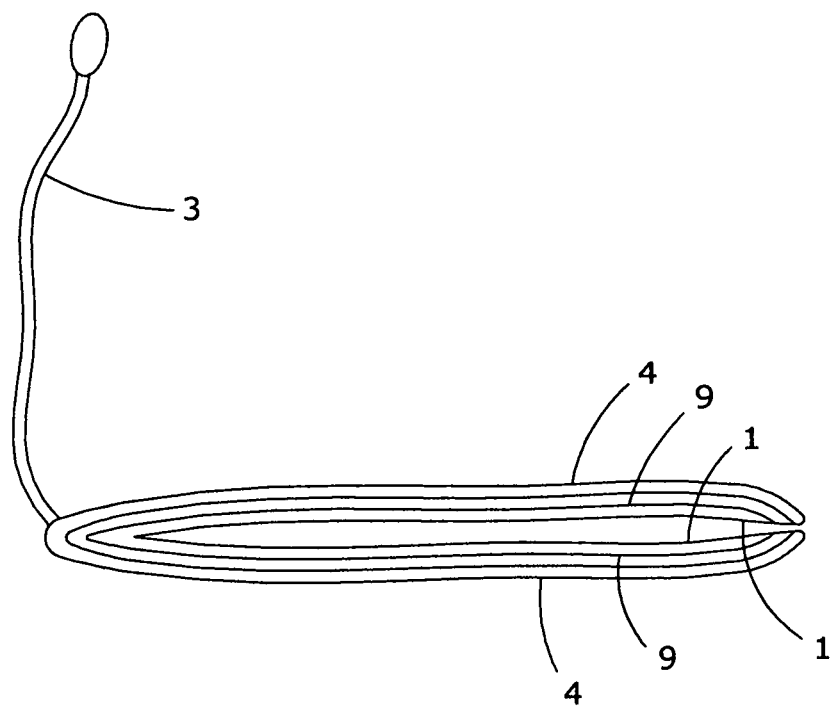
FIG. 3 shows a WATER HOG of the second embodiment, as it would appear when laid down.

FIG. 3 shows a WATER HOG of the second embodiment, as it would appear when laid down. The SAP (1) is on top of the substrate (9), and this can be seen.

Figure 4:
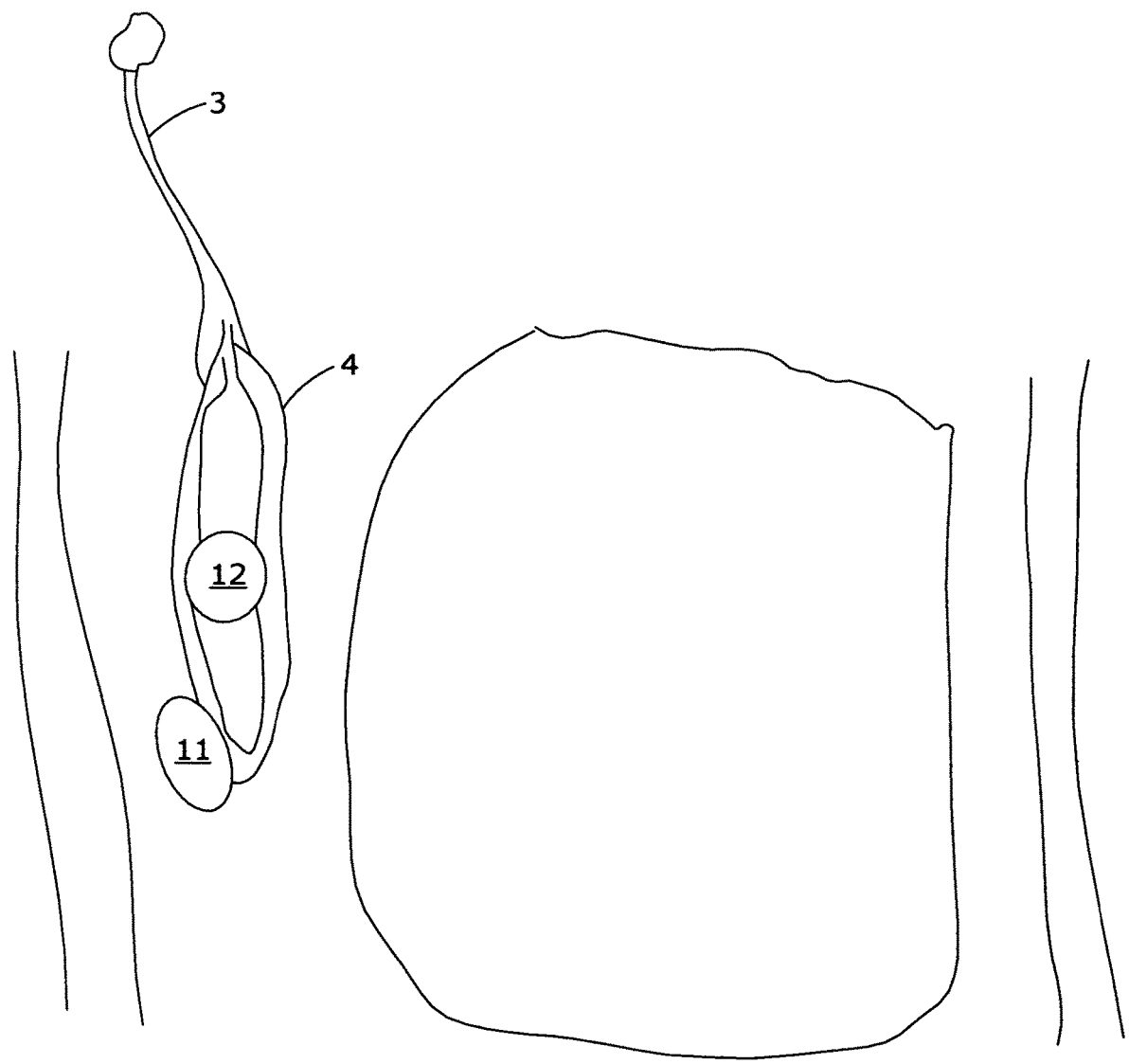
FIG. 4 shows a WATERHOG with specialized microbes, inserted into the interstitial spaces between the walls of a fuel reservoir at a fueling facility.

FIG. 4 shows a WATER HOG of the fourth embodiment, with specialized microbes, inserted into the interstitial spaces between the walls of a gasoline reservoir at a fueling facility. This WATER HOG has both a remediation pouch (10) and a remediation chamber (11). The specialized microbes are cleaning up a certain pollutant within the interstitial spaces related to the gasoline reservoir.

Figure 5:
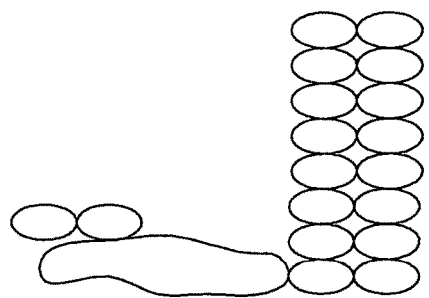
FIG. 5 shows a WATER HOG being used together with several watery spill cleanup mats of the invention of U.S. Pat. No. 8,512,522, and a wall of water-activated FLOODBAGs of the invention of application Ser. No. 16/280,013. The WATER HOG is being used to remove a layer of water, and a layer of "sheen" in-between the pure water below and the oil products above. The watery spill cleanup mats of the invention of U.S. Pat. No. 8,512,522 are to the left of the WATER HOG, cleaning up a prior spill, and the FLOODBAGs are to the right of the WATER HOG, acting as a barrier to further spills.
Figure 5:
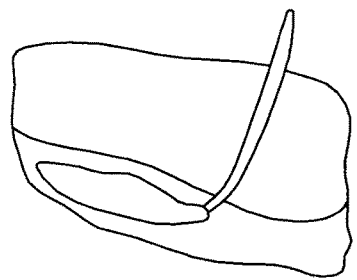
Figure 5:
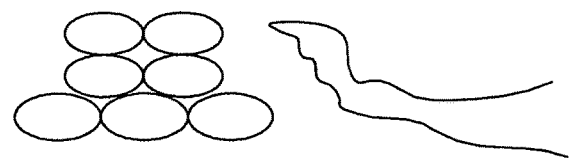

FIG. 5 shows a WATER HOG being used together with several watery spill cleanup mats of the invention of U.S. Pat. No. 8,512,522, and a wall of FLOODBAGs of the invention of application Ser. No. 16/280,013. The WATER HOG is being used to remove a layer of water, and a layer of "sheen" in-between the pure water below and the oil products above. The watery spill cleanup mats of the invention of U.S. Pat. No. 8,512,522 are to the left of the WATER HOG, cleaning up a prior spill, and the FLOODBAGs are to the right of the WATER HOG, acting as a barrier to further spills.

Figure 6:
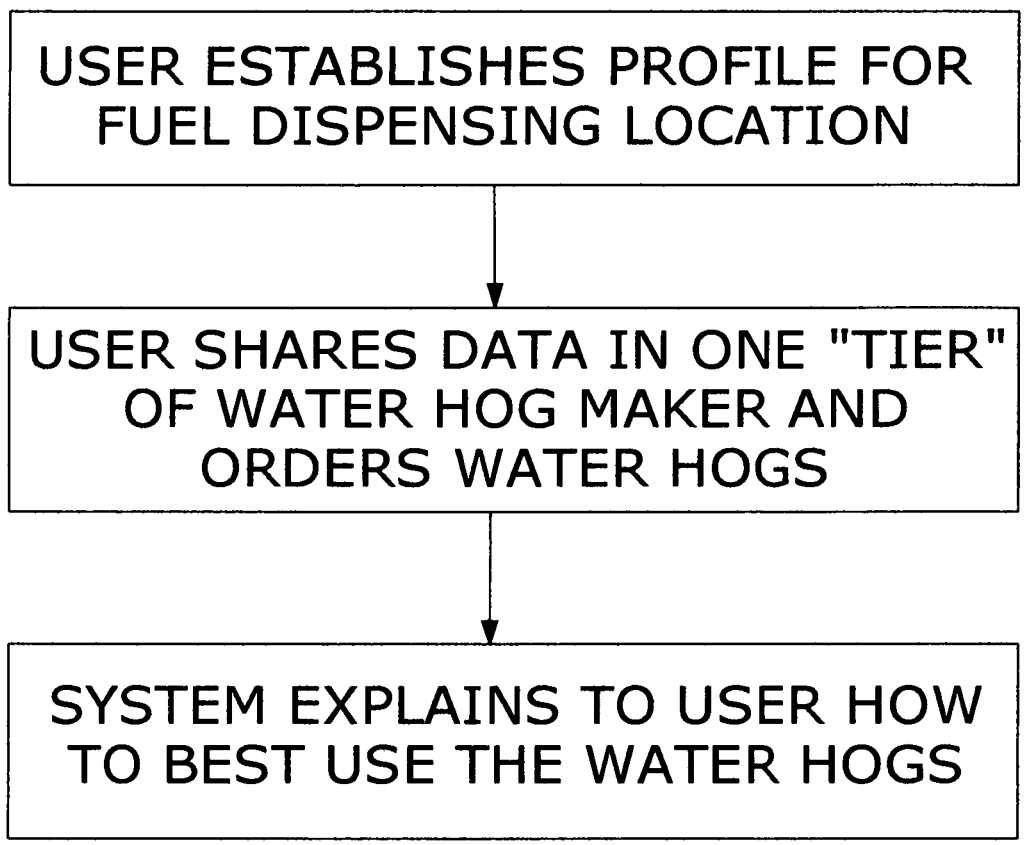
FIG. 6 shows a flow chart of the steps of one process of employing the system of U.S. Pat. No. 10,019,430 to more efficiently use WATER HOGs to clean a specific Tank.

FIG. 6 shows a flow chart of the steps of one process of employing the system of U.S. Pat. No. 10,019,430 to more efficiently use WATER HOGs to clean a specific Tank. The user would have pre-established a secure Profile within the system of the invention of U.S. Pat. No. 10,019,430, for a fuel dispensing location, and would have included forms data related to that fuel dispensing location, including information about the shape and number of Tanks there. The user would order WATER HOGs, would quickly send the WATER HOG manufacturer the information in some of the tiers, pertaining to the Tanks the user desires to clean, and the system would then send the user information about the best ways to use the WATER HOGs to eliminate any stray water in the Tanks of the fuel dispensing location.

Figure 7:
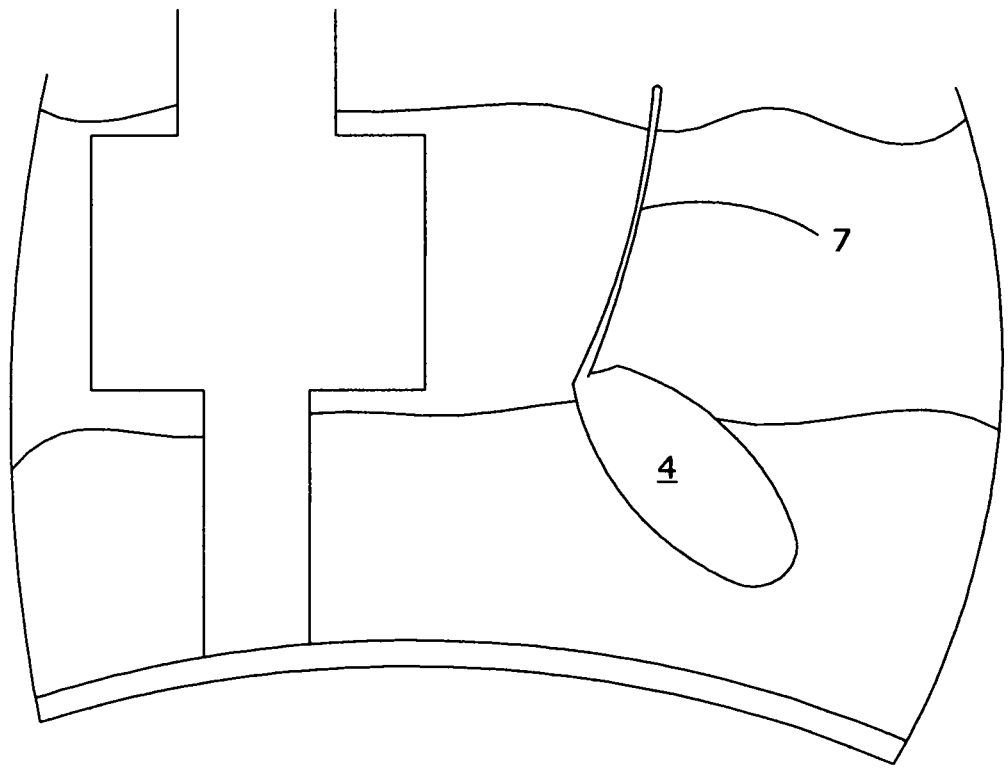
FIG. 7 shows a WATER HOG of the first embodiment, as it would appear when laid down.

FIG. 7 shows a WATER HOG of the first embodiment, as it would appear when laid down. The containment skin (4) is visible. This WATER HOG has a leash (7) made of polypropylene. This particular WATER HOG is in a Turbine Sump, which is on top of a fuel storage Tank. The Tank is cylindrically shaped, and the part of the Tank immediately below the sump causes the bottom of the Tank to be convex-shaped. Water might accumulate in the lowermost areas of the bottom of the turbine sump, even if it has not accumulated in the other areas of the bottom of the turbine sump. The WATER HOG is flexible enough to capture such water.

Figure 8:
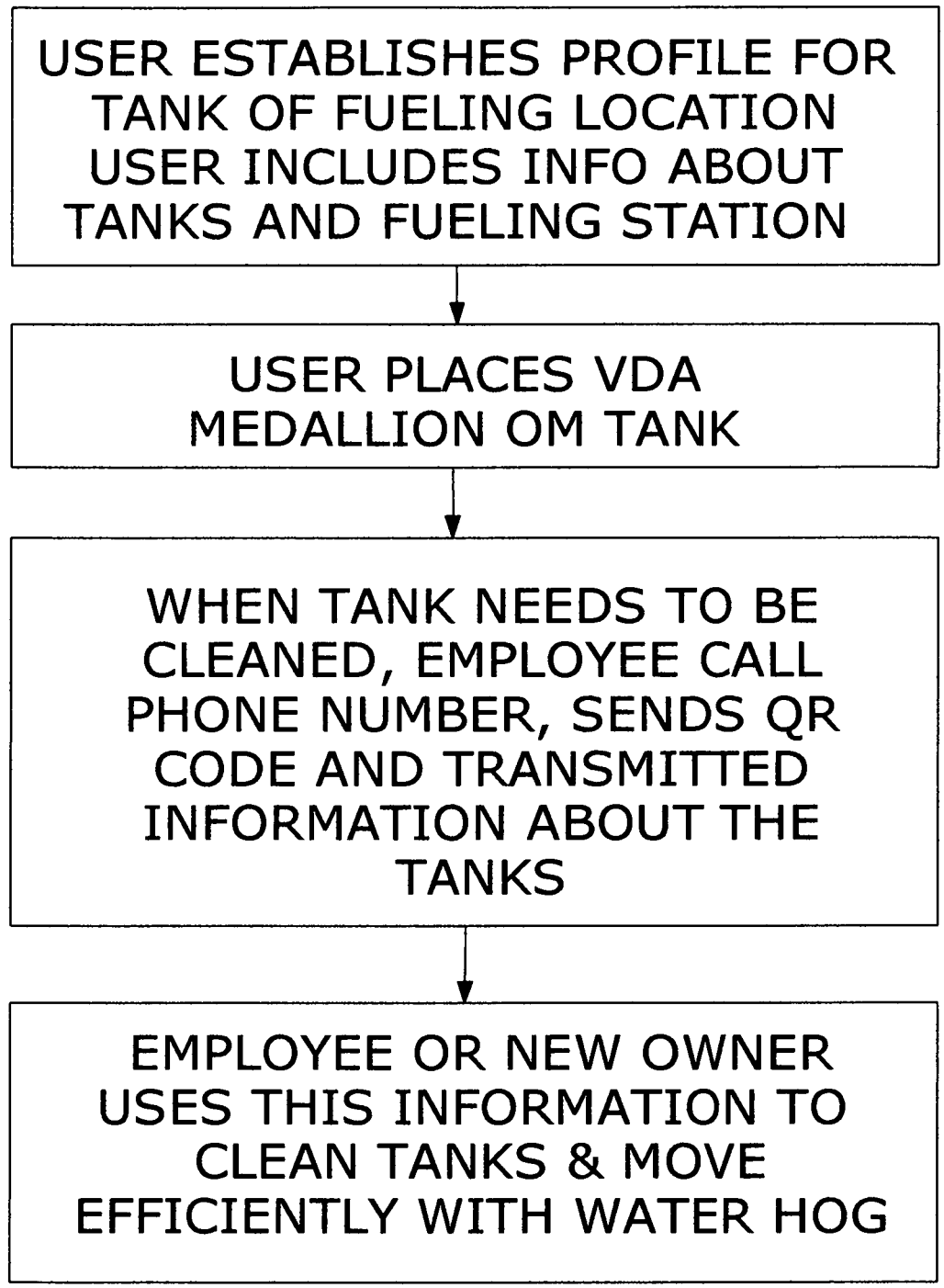
FIG. 8 shows a flow chart through which a user uses a concept similar to the invention of application Ser. No. 14/617,355 to utilize WATER HOGS more profitably.

FIG. 8 shows a flow chart through which a user uses a concept similar to the invention of application Ser. No. 14/617,355 to utilize WATER HOGS more profitably. The user would place a medallion similar to a "VDA medallion" on one of the Tanks, and the medallion would include an alphanumeric code, a QR code, and a phone number. An employee of the user could call the phone number and identify himself or herself, transmit the alphanumeric code, and QR code, and then be given direct access to a previously-created profile for that Tank. The profile would include information about that specific Tank, and how to clean it more efficiently with WATER HOGs. The user could therefore clean and maintain the sump more efficiently. Profiles can also be established for other types of Tanks. This methodology can also be used to ensure that when new employees start working for the fueling location, or a new owner acquires the fueling location, he or she can access the profile and the VDA system can send the new owner or employee specific information about the Tank or the fuel dispensing location, including information about specific characteristics or idiosyncrasies of each of the Tanks.

Figure 9:
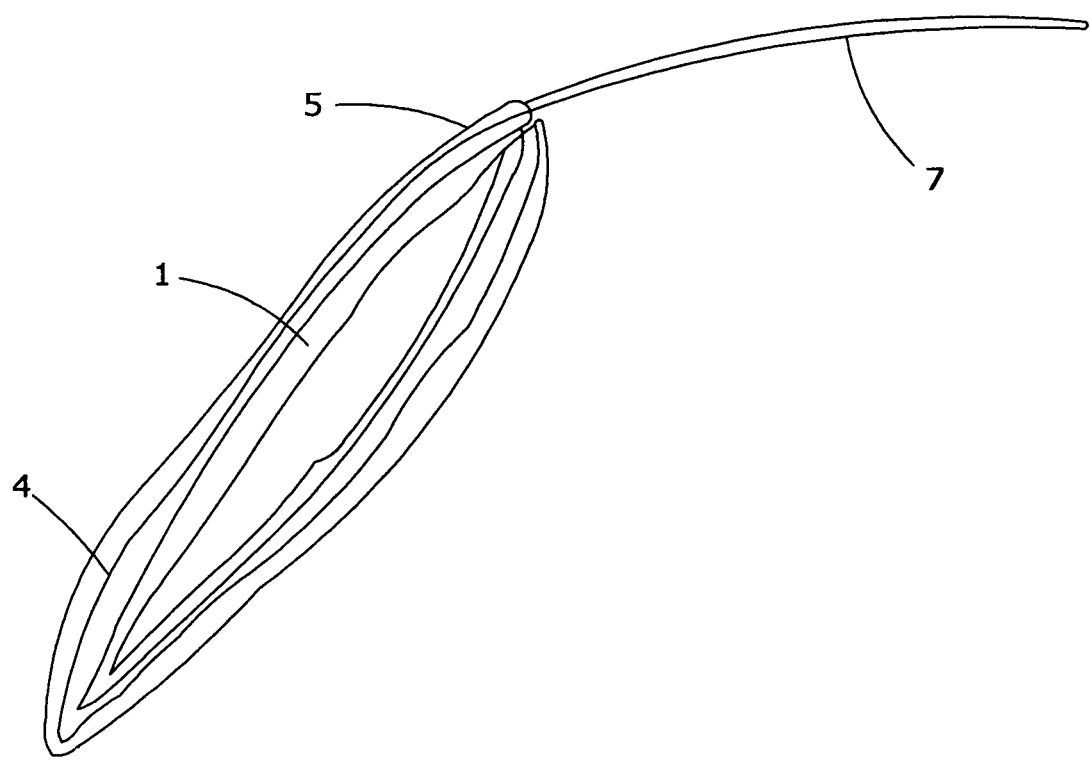
FIG. 9 shows a WATER HOG of the sixth embodiment, with a protective casing (5) and containment skin (4).

FIG. 9 shows a cut-away version of a WATER HOG of the sixth embodiment, with a protective casing (5). The protective casing (PC) (5) surrounds the containment skin (4), which provides further protection to the rest of the WATER HOG.

Figure 10:
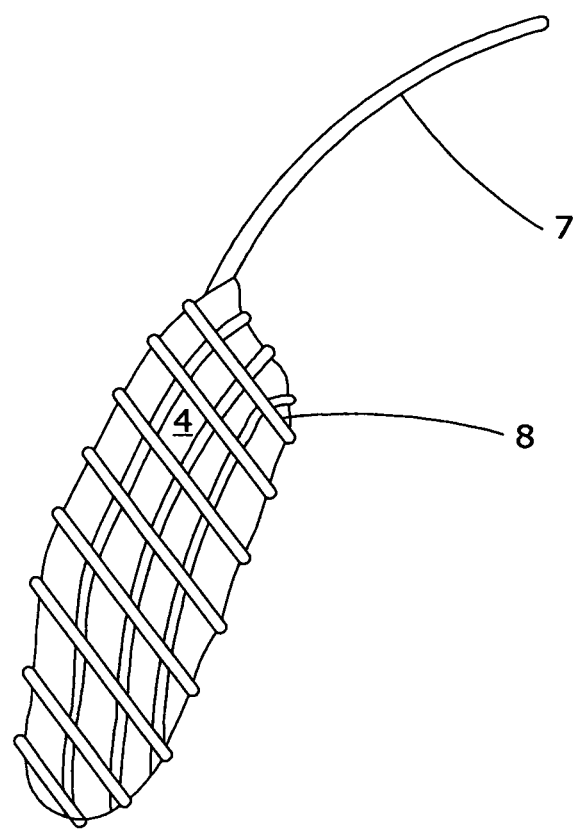
FIG. 10 shows an example of an embodiment of the WATER HOG with a mesh surrounding the containment skin (4).

FIG. 10 shows an example of an embodiment of the WATER HOG with a mesh (8) surrounding the containment skin (4). The mesh protects the containment skin (4).

Figure 11:
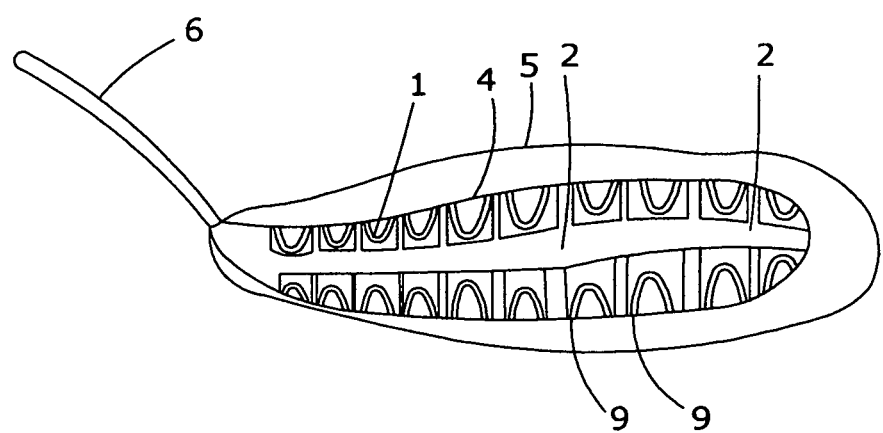
FIG. 11 shows a cut-away version of the second embodiment of the WATER HOG with an Internal skeleton (2), and Rod (6).

FIG. 11 shows a cut-away version of the second embodiment of the WATER HOG, with an Internal skeleton (2). The substrate is connected to the internal skeleton (2). A rod (6) is part of this WATER HOG, and can be used to push the WATER HOG into places where it is desired.

Figure 12:
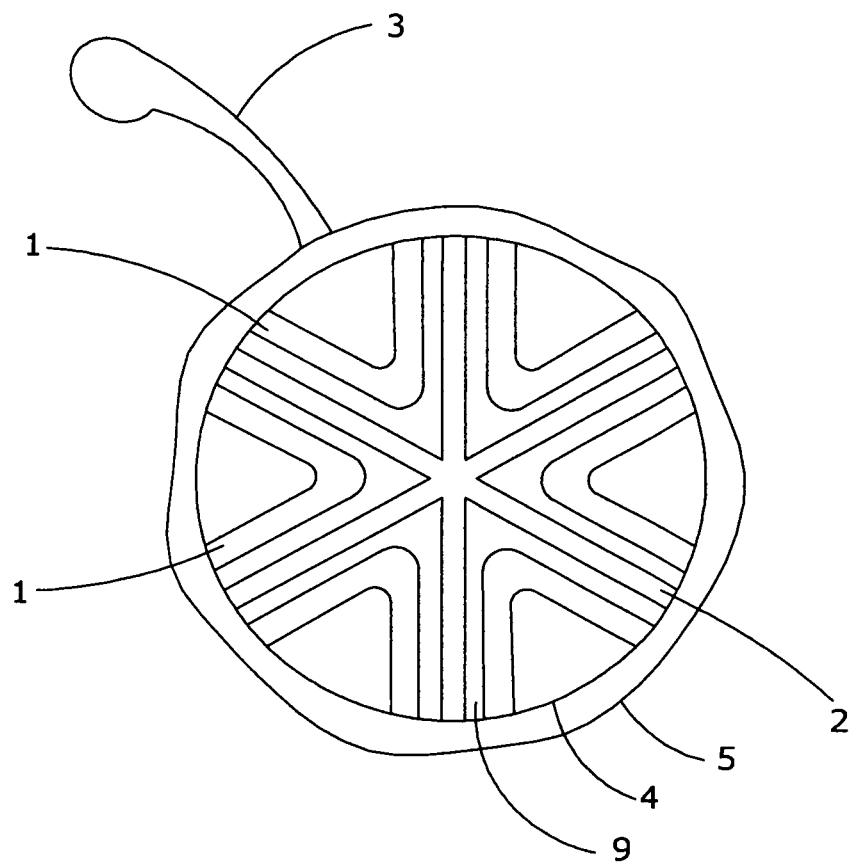
FIG. 12 shows a cross-section of FIG. 11, where the substrate (9) is adhered to the internal skeleton (2).

FIG. 12 shows a cut-away cross-section of FIG. 11, where the substrate (9) is adhered to the internal skeleton (2).

The invention claimed is:

1. A device for absorbing water within a tank comprising:
a containment skin defining a volume;
a quantity of a super-absorbing polymer disposed within said volume, wherein the super-absorbing polymer is configured to absorb water within the tank;
an agent selected from the group consisting of chelating agents, bacteria, and fungi, wherein said agent is contained within said volume and/or secured to an exterior surface of the containment skin.

2. The device of claim 1, further comprising a remediation chamber that is disposed within said volume, wherein said agent contained within said volume is disposed within said remediation chamber.

3. The device of claim 1, further comprising a remediation pouch fixed to an exterior surface of said containment skin, wherein said agent secured to an exterior surface of the containment skin is disposed within said remediation pouch.

4. The device of claim 1, further comprising a tether attached to an exterior surface of the containment skin.

5. A device for absorbing water within a tank comprising:
a water permeable containment skin defining a volume;
a skeleton disposed within said volume;
a substrate disposed within said volume, wherein said substrate is adhered to an exterior surface of the skeleton;
a quantity of super-absorbing polymer disposed within said volume, wherein the super-absorbing polymer is configured to absorb water within the tank, and wherein said quantity of super-absorbing polymer is bonded to an exterior surface of the substrate and is adjacent to an interior surface of the containment skin.

6. The device of claim 5, wherein said skeleton is defined by a central core member and plurality of rod-shaped members extending radially outwardly from the central core member.

7. The device of claim 5, further comprising a protective skin surrounding an exterior surface of said containment skin.

8. The device of claim 5, further comprising a tether attached an exterior surface of the containment skin.

9. The device of claim 5, further comprising a rod attached an exterior surface of the containment skin.

* * * * *

UNITED STATES PATENT AND TRADEMARK OFFICE
CERTIFICATE OF CORRECTION

PATENT NO. : 10,646,796 B1
APPLICATION NO. : 16/602225
DATED : May 12, 2020
INVENTOR(S) : Thomas Ralph Rossi Page 1 of 1

It is certified that error appears in the above-identified patent and that said Letters Patent is hereby corrected as shown below:

In the Specification

Column 5, Line 13: Add "a" between "as" and "greater".

Column 8, Line 40: Delete "SAP/Imbiber Beads" and replace it with "SAP and/or Imbiber Beads".

Column 10, Line 48: Add a "." after the word "material".

Column 11, Line 27: Add a "," between the word "leash" and the word "a".

Column 11, Line 33: Add the word "place" between "in" and "on".

Column 11, Lines 38-39: Between the words "SAP" and "and" add the words "in place".

Column 12, Line 9: Delete "Range or remediation" and replace with the words "Range of remediation".

Column 12, Line 52: Delete """ which is immediately before the word "agents".

Column 14, Line 21: Add "of" between "capable" and "degrading".

Column 14, Line 22: Delete the "," after "weight" and add a "." instead. Capitalize the letter "B" in "Bacteria".

Column 14, Line 60: Delete "a soil" and replace it with "as oil".

Column 15, Line 10: Delete "polyethylene" and replace it with "polypropylene".

Column 15, Line 66: Delete "above-ground".

Signed and Sealed this
Twenty-seventh Day of October, 2020

Andrei Iancu
*Director of the United States Patent and Trademark Office*